US012644708B2

(12) United States Patent
Baranek et al.

(10) Patent No.: US 12,644,708 B2
(45) Date of Patent: Jun. 2, 2026

(54) RADAR INERTIAL VERTICAL HYBRID FILTER SCHEME RESISTANT TO TERRAIN VARIATIONS

(71) Applicant: Honeywell International s.r.o., Prague (CZ)

(72) Inventors: Radek Baranek, Brno (CZ); Vibhor L Bageshwar, Rosemount, MN (US); Douglas Mark Weed, Forest Lake, MN (US); Tomas Vaispacher, Brno (CZ)

(73) Assignee: Honeywell International s.r.o., Prague (CZ)

( * ) Notice: Subject to any disclaimer, the term of this patent is extended or adjusted under 35 U.S.C. 154(b) by 308 days.

(21) Appl. No.: 18/360,739

(22) Filed: Jul. 27, 2023

(65) Prior Publication Data

US 2025/0035444 A1     Jan. 30, 2025

(51) Int. Cl.
    *G01C 21/16*       (2006.01)
    *B64D 45/04*       (2006.01)
              (Continued)

(52) U.S. Cl.
    CPC ......... *G01C 21/1652* (2020.08); *B64D 45/04* (2013.01); *G01C 5/005* (2013.01);
              (Continued)

(58) Field of Classification Search
    CPC ........ G01C 5/005; G01C 5/06; G01C 21/005; G01C 21/1652; G01C 23/00; G01S 13/882; G01S 13/86; B64D 45/04
    See application file for complete search history.

(56) References Cited

U.S. PATENT DOCUMENTS 6,691,004 B2 *   2/2004   Johnson .................... G08G 5/80
                                         73/178 R
2002/0120656 A1 *   8/2002   Jabbari .............. H03H 17/0294
                                         708/316

(Continued)

FOREIGN PATENT DOCUMENTS

CN       107074360 B     1/2019
CN       106681344 B     8/2019

(Continued)

OTHER PUBLICATIONS

Gray et al., "An integrated GPS/INS/baro and Radar Altimeter System for Aircraft Precision Approach Landings", Proceedings of the IEEE 1995 National Aerospace and Electronics Conference, NAECON 1995, May 22-26, 1995, Dayton, OH, USA, vol. 1, pp. 161 through 168.

(Continued)

*Primary Examiner* — Christian Chace
*Assistant Examiner* — Nicholas Stryker
(74) *Attorney, Agent, or Firm* — Fogg & Powers LLC

(57) ABSTRACT

A system comprises a radar altimeter producing range-to-ground measurements; an aided INS or AHRS producing vertical acceleration, roll, and pitch measurements; an air data system producing barometric altitude measurements; and a processor including a BIV hybrid filter, and a RAIV hybrid filter set. The BIV hybrid filter receives the vertical acceleration measurements and barometric altitude measurements. The RAIV hybrid filter set receives input measurements comprising the vertical acceleration, roll, and pitch measurements, BIV hybrid filter statistics, and the range-to-ground measurements. The RAIV hybrid filter set comprises a plurality of hybrid filters that operate in parallel with each other in respective filter slots. A hybrid filter in each filter slot operates on partially overlapping, time limited staggered intervals of the input measurements, with respect to other (Continued)

hybrid filters in other filter slots. Estimated vertical navigation statistics are computed based on input statistics processed in the filter slots.

15 Claims, 4 Drawing Sheets

(51) Int. Cl.

| | |
|---|---|
| *G01C 5/00* | (2006.01) |
| *G01C 5/06* | (2006.01) |
| *G01C 21/00* | (2006.01) |
| *G01C 23/00* | (2006.01) |
| *G01S 13/86* | (2006.01) |
| *G01S 13/88* | (2006.01) |

(52) U.S. Cl.
CPC ............. *G01C 5/06* (2013.01); *G01C 21/005* (2013.01); *G01S 13/86* (2013.01); *G01S 13/882* (2013.01); *G01C 23/00* (2013.01)

(56) References Cited

U.S. PATENT DOCUMENTS

| | | | | |
|---|---|---|---|---|
| 2004/0267444 | A1* | 12/2004 | Coatantiec ........... | G01C 21/005 701/4 |
| 2016/0290826 | A1* | 10/2016 | Brenner ............... | G01C 23/005 |
| 2017/0102713 | A1* | 4/2017 | Lim ...................... | G01S 13/935 |
| 2022/0365224 | A1* | 11/2022 | Rose ..................... | G01S 13/882 |
| 2023/0314141 | A1* | 10/2023 | Li .......................... | G01C 21/165 701/301 |
| 2023/0392929 | A1* | 12/2023 | Kim ..................... | G01C 21/005 |

FOREIGN PATENT DOCUMENTS

| | | | |
|---|---|---|---|
| CN | 108168509 | B | 8/2019 |
| CN | 116256001 | A | 6/2023 |
| EP | 1466139 | B1 | 2/2011 |
| EP | 3988900 | A1 | 4/2022 |
| EP | 4220079 | A1 | 8/2023 |
| FR | 2998958 | B1 | 10/2019 |
| JP | 2022078702 | A | 5/2022 |
| KR | 102119254 | B1 | 6/2020 |
| WO | 2018094576 | A1 | 5/2018 |

OTHER PUBLICATIONS

Won et al., "A Kalman/Particle Filter-Based Position and Orientation Estimation Method Using a Position Sensor/ Inertial Measurement Unit Hybrid System", IEEE Transactions on Industrial Electronics, May 2010, vol. 57, No. 5, Pages Cover through 1798.

Bageshwar et al., "Radar Altimeter Inertial Vertical Loop", U.S. Appl. No. 17/586,545, filed Jan. 27, 2022, pp. 1 through 40, Published: US.

European Patent Office, "Extended European Search Report", dated Oct. 30, 2024, from U.S. Appl. No. 18/360,739, from Foreign Counterpart to U.S. Appl. No. 18/360,739, pp. 1 through 8, Published: EP.

Rao, K Deergha, "Integration of GPS and Baro-Inertial Loop Aided Strapdown INS and Radar Altimeter", Paper No. 137-A, Iete Journal of Research, vol. 43, No. 5, Sep.-Oct. 1997, pp. 383 through 390.

Vasquez et al., "Enhanced Motion and Sizing of Bank in Moving-Bank MMAE", Proceedings of the American Control Conference, San Diego, California, USA, Jun. 2, 1999, vol. 3, No. 2, pp. 1555 through 1562.

* cited by examiner

RADAR INERTIAL VERTICAL HYBRID FILTER SCHEME RESISTANT TO TERRAIN VARIATIONS

STATEMENT REGARDING GOVERNMENT SPONSORED RESEARCH OR DEVELOPMENT

The project leading to this application has received funding from the Clean Sky 2 Joint Undertaking under the European Union's Horizon 2020 research and innovation programme under grant agreement No 945535.

BACKGROUND

The uncrewed aircraft system (UAS) and urban air mobility (UAM) vehicle market requires accurate navigation parameters with integrity across the different UAS and UAM flight phases to support safe autonomous operation. One navigation solution that provides improved accuracy and integrity for vertical navigation parameters during the landing phase is a hybrid filter blending inertial based vertical acceleration measurements with radar altimeter measurements. However, this navigation solution needs to deal with terrain variations, which can generate inconsistencies between inertial and radar-based measurements and their statistics. These measurement inconsistencies can lead to vertical parameter estimates that fail to satisfy UAS and UAM requirements in a landing zone.

One possible solution for the measurement inconsistencies is to include terrain uncertainty in the hybrid filter in the form of a state, but this solution also increases the uncertainty of the estimated vehicle kinematic states so that the performance benefit of hybridization is reduced. Another possible solution is to use a terrain database together with horizontal vehicle position information to compensate for terrain variations. However, such a solution significantly increases the complexity of the navigation system especially if integrity is required.

SUMMARY

A system comprises a radar altimeter onboard a vehicle and operative to produce range-to-ground measurements for the vehicle; an aided inertial navigation system (INS) or an Attitude and Heading Reference System (AHRS) onboard the vehicle, the aided INS or the AHRS operative to produce vertical acceleration, roll, and pitch measurements for the vehicle; an air data system onboard the vehicle and operative to produce barometric altitude measurements for the vehicle; and at least one processor onboard the vehicle, the at least one processor including a barometric inertial vertical (BIV) hybrid filter, and a radar altimeter inertial vertical (RAIV) hybrid filter set that is in operative communication with the BIV hybrid filter. The BIV hybrid filter is configured to receive vertical acceleration measurements from the aided INS or the AHRS, and barometric altitude measurements from the air data system. The RAIV hybrid filter set is configured to receive input measurements comprising the vertical acceleration, roll, and pitch measurements from the aided INS or the AHRS, BIV hybrid filter statistics, and the range-to-ground measurements from the radar altimeter. The RAIV hybrid filter set comprises a plurality of hybrid filters configured to operate in parallel with each other in respective filter slots, wherein a hybrid filter in each filter slot operates on partially overlapping, time limited staggered intervals of the input measurements, with respect to other hybrid filters in other filter slots, wherein an interval size and an overlapping size are respectively user defined by a maximum filter duration parameter and a filter density time parameter. The estimated vertical navigation statistics for the vehicle are computed based on the input measurements processed in the filter slots of the hybrid filters that are enabled in the RAIV hybrid filter set. The filter slots of the hybrid filters are operative to mitigate effects of terrain variations on the estimated vertical navigation statistics for the vehicle that are output by the RAIV hybrid filter set.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for implementing a RAIV hybrid filter scheme that is resistant to terrain variations are described herein.

The present system and method solves for the terrain variation effects on radar altimeter measurement statistics by designing a navigation system with multiple hybrid filters, running in parallel, with each filter operating on a limited number of sensor measurements. This approach limits the ability of terrain variations to increase the estimated vertical parameter error statistics during the landing phase of a vehicle. This allows a vehicle navigation system to satisfy vertical UAS and UAM navigation requirements in a landing zone.

The present approach provides the technical advantages to the navigation system of being able to satisfy navigation requirements with terrain changes without the use of a map. The present techniques also provide for the integrity of the estimated vertical parameters supporting autonomous landing operations. This provides robust, estimated vertical navigation parameters for UAS and UAM operators.

The present approach provides a solution to measurement limitations when using a radar altimeter inertial vertical loop (RIVL) filter. The RIVL filter is an algorithm that fuses vertical acceleration and radar altimeter measurements to estimate vertical parameters (altitude and vertical velocity) with accuracy outperforming the individual sensors. Typical designs neglect the terrain variations along a vehicle flightpath, which results in errors of estimated vertical parameters that fail to satisfy navigation requirements even long after the terrain variations occur. The design decision to neglect terrain variation is driven by increased complexity of the system when using a terrain database or by reduced accuracy when terrain uncertainties are introduced to the filter.

The present system employs multiple hybrid filters that are running in parallel, each operating on partially overlapping time limited staggered intervals of input measurements, to mitigate the effects of terrain variations on the estimated vertical parameters. A barometric inertial vertical (BIV) hybrid filter is also used in the system and provides a trusted method to initialize part of the state vector (vertical velocity, vertical acceleration bias) and state covariance matrix for the multiple hybrid filters. The inclusion of time intervals of sensor measurements guarantees that the system will forget terrain variations after a predefined amount of time.

Further details regarding the present system and method are described as follows and with reference to the drawings.

Figure 1:
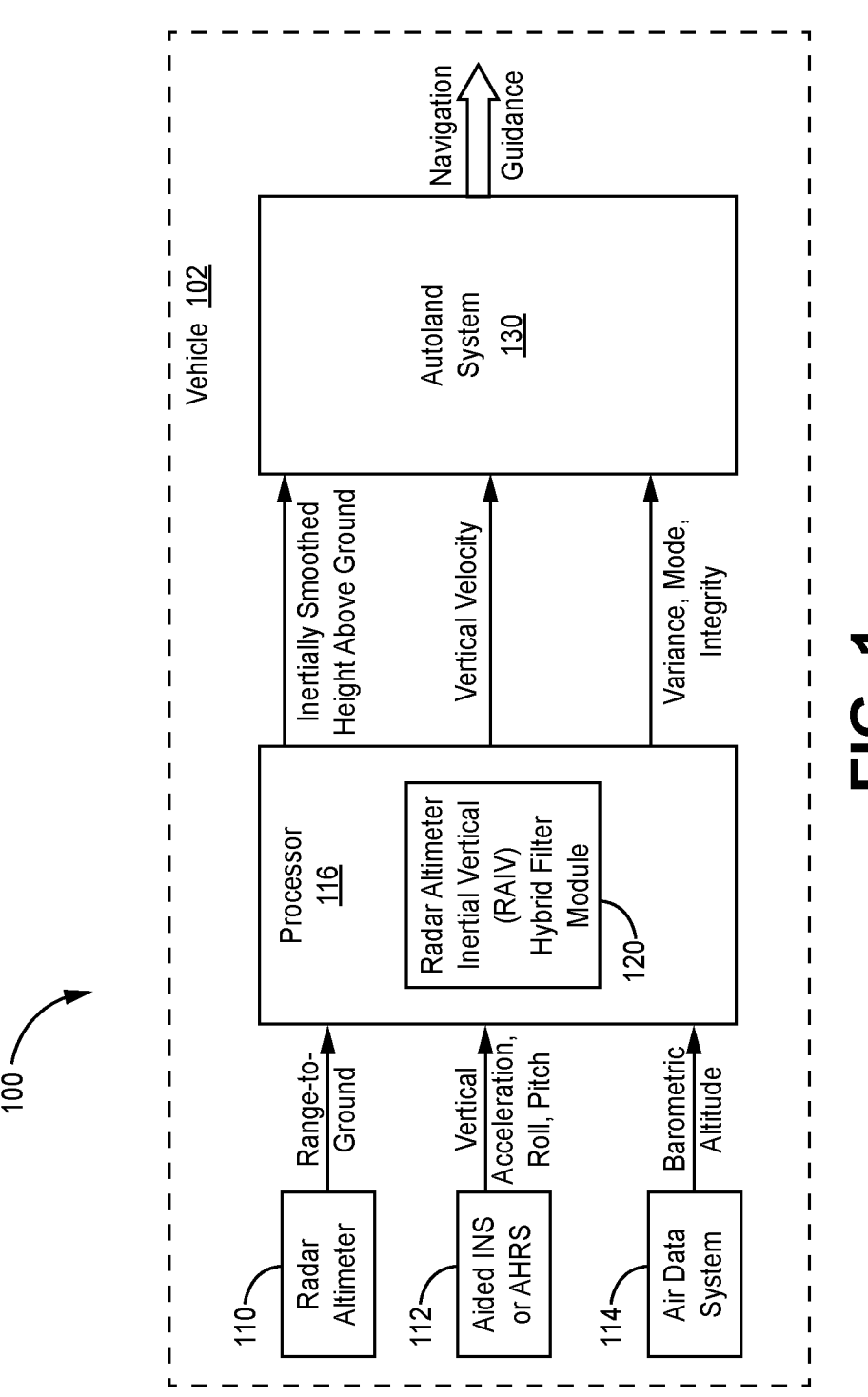
FIG. 1 is a block diagram of a system for implementing a radar altimeter inertial vertical (RAIV) hybrid filter scheme, according to one embodiment.

FIG. 1 is a block diagram of a system 100 for implementing a radar altimeter inertial vertical hybrid filter that is resistant to terrain variations, according to one embodiment. The system 100 is implemented for a vehicle 102, and comprises various onboard sensors, including a radar altimeter 110, an aided inertial navigation system (INS) or attitude and heading reference system (AHRS) 112, and an onboard air data system 114. The radar altimeter 110 is operative to produce range-to-ground measurements for vehicle 102. The aided INS/AHRS 112 is operative to produce vertical acceleration, roll, and pitch statistics for vehicle 102. The air data system 114 is operative to produce barometric altitude measurements for vehicle 102. Regardless of their source, the sensor measurement statistics or vertical parameter statistics estimated by the aided INS/AHRS will be referred to as measurements hereafter.

At least one processor 116 onboard vehicle 102 is configured to host a radar altimeter inertial vertical (RAIV) hybrid filter module 120. The processor 116 is in operative communication with radar altimeter 110, aided INS/AHRS 112, and air data system 114. The RAIV hybrid filter module 120 is operative to receive the range-to-ground measurements from radar altimeter 110, the vertical acceleration, roll, and pitch measurements from the aided INS/AHRS 112, and the barometric altitude measurements from air data system 114.

The RAIV hybrid filter module 120 is operative to process the received measurements to generate various parameters, including an inertially smoothed height above ground; a vertical velocity; and variance, integrity, and filter mode information. These parameters are output to an onboard vehicle navigation system such as an autoland system 130 for vehicle 102. The autoland system 130 is operative to generate and output navigation information for safely landing vehicle 102 in a landing zone.

Figure 2:
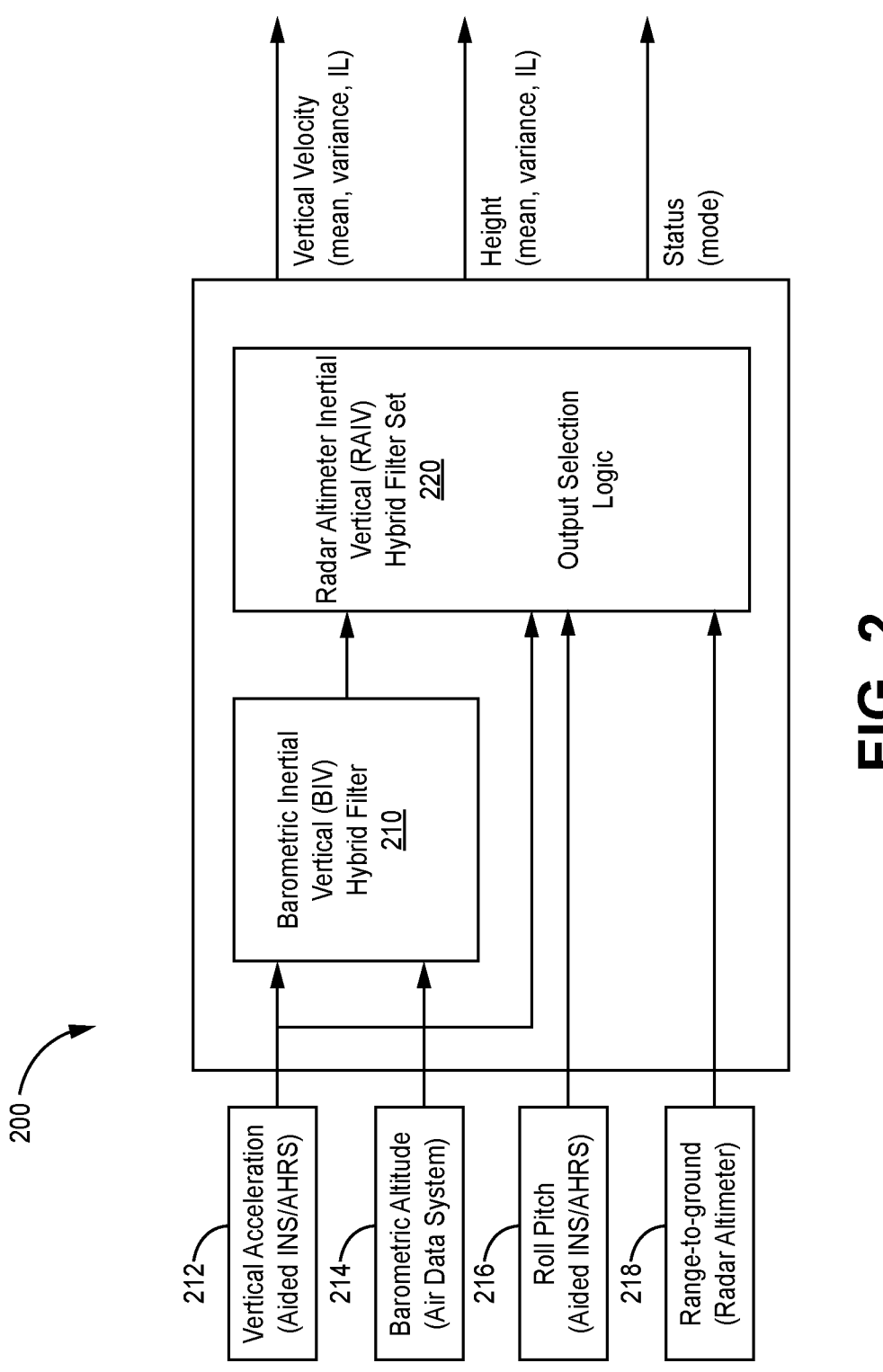
FIG. 2 is a block diagram of an algorithm for implementing the RAIV hybrid filter scheme of FIG. 1.

FIG. 2 is a block diagram illustrating further details of a RAIV hybrid filter algorithm 200, such as employed in RAIV hybrid filter module 120, according to one embodiment. As shown in FIG. 2, RAIV hybrid filter algorithm 200 includes a barometric inertial vertical (BIV) hybrid filter 210, and a RAIV hybrid filter set 220 including output selection logic, which is in operative communication with BIV hybrid filter 210. The BIV hybrid filter 210 is configured to receive vertical acceleration measurements 212 such as from aided INS/AHRS 112, and barometric altitude measurements 214 such as from air data system 114. The RAIV hybrid filter set 220 is also configured to receive vertical acceleration measurements 212, as well as output data including BIV hybrid filter statistics from BIV hybrid filter 210. In addition, RAIV hybrid filter set 220 is configured to receive roll and pitch measurements 216 such as from aided INS/AI-HRS 112, and range-to-ground measurements 218 such as from radar altimeter 110. The RAIV hybrid filter set 220 is operative to process the received measurements, to generate and output various parameters, including vertical velocity (mean, variance, protection level), height (mean, variance, protection level), and status (mode).

As described in further detail hereafter, RAIV hybrid filter set 220 comprises a plurality of hybrid filters configured to operate in parallel with each other in respective filter slots. A filter in each slot operates on partially overlapping, time limited staggered intervals of the input measurements, with respect to other filters in other slots. An interval size and an overlapping size are user defined by a maximum filter duration parameter and a filter density time parameter. The estimated vertical navigation statistics for the vehicle are computed based on the input vehicle kinematic statistics and the measurements processed in the filter slots of the hybrid filters that are enabled in the RAIV hybrid filter set. The estimated vertical navigation statistics for the vehicle can include vertical position and its error statistics, and vertical velocity and its error statistics. The filter slots of the hybrid filters are operative to mitigate effects of terrain variations on the estimated vertical navigation statistics for the vehicle, output by the RAIV hybrid filter set.

The multiple hybrid filters utilize a hybrid vertical Kalman filter design with the Kalman filter states and corresponding model including: altitude, which is an integral of vertical velocity; vertical velocity, which is an integral of input vertical acceleration compensated by estimated vertical acceleration bias; altitude sensor bias (for barometer or radar altimeter), which, in one embodiment, is modeled as a random correlated process (1st order, Gauss-Markov process) with a time constant and standard deviation; and vertical acceleration bias, which, in one embodiment, is modeled as a random correlated process (1st order, Gauss-Markov process) with a time constant and standard deviation. The filter inputs to drive the process model include vertical acceleration measurements. The filter measurements and corresponding measurement model include an altitude measurement model (for either the barometric altitude or radar altimeter) as follows: altitude state+estimated altitude sensor bias=altitude measurement.

The altitude sensor bias model parameters (time constant and standard deviation) depend on the specific altitude sensor error model and can be a function of the vehicle kinematic states (for example altitude, vertical velocity, horizontal velocity). The roll and pitch input statistics are used to resolve radar altimeter measurements to the vertical direction or to exclude radar altimeter measurements in the case of excessive vehicle roll and pitch angles.

Figure 3:
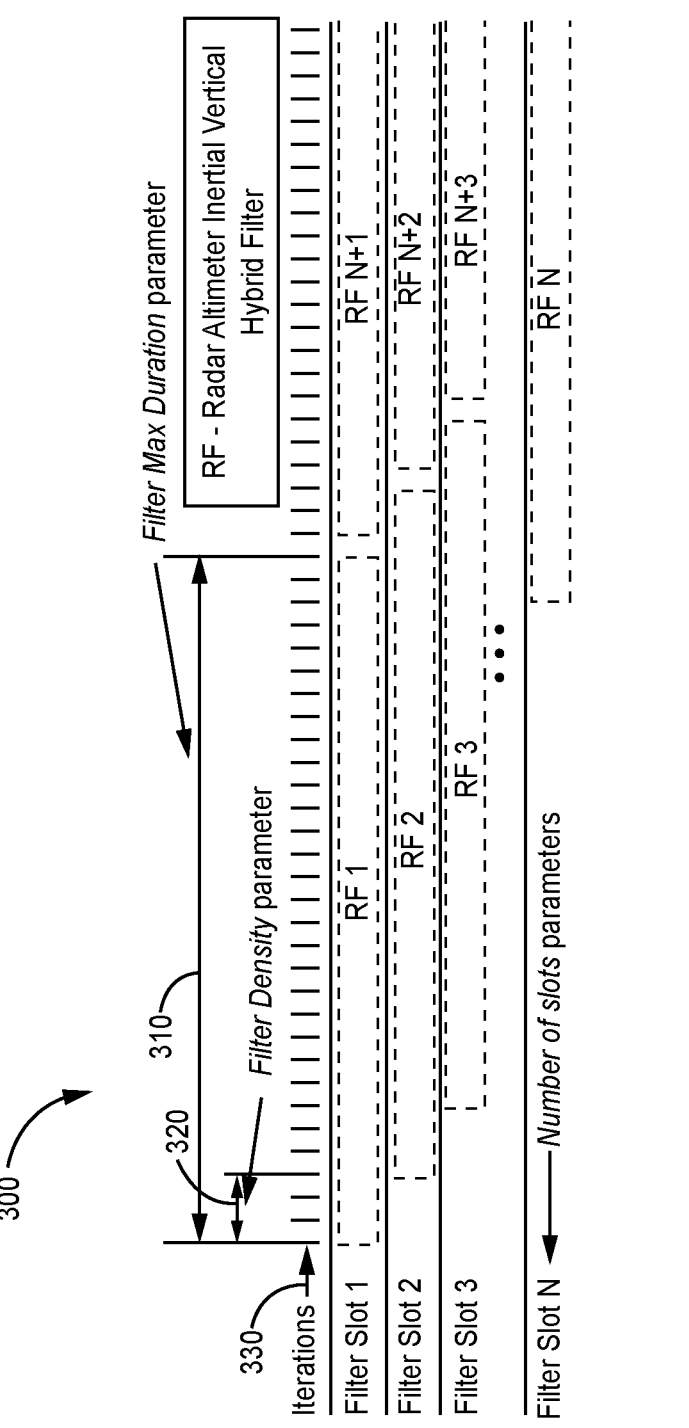
FIG. 3 is a diagrammatic representation of a method for addressing terrain variation effects, using a RAIV hybrid filter set.

FIG. 3 is a diagrammatic representation of a method 300 for addressing terrain variation effects, according to the present approach. As shown, method 300 provides a limited duration, parallel Kalman filter (KF) implementation, which includes a filter maximum duration parameter 310, and a filter density parameter 320 within the filter maximum duration parameter 310. The method 300 provides a specified number of filter slots, such as a filter slot 1, a filter slot 2, a filter slot 3, . . . , a filter slot N (where N is a number of slots parameter), and each filter slot is occupied by a RAIV hybrid filter (RF).

A plurality of iterations 330 are sequentially performed for each filter slot. Each filter slot is initialized (with a mean and covariance) from a current BIV hybrid filter output and a radar altimeter measurement. The multiple RAIV hybrid filters operate in parallel on partially overlapping, time limited staggered intervals (defined by the filter maximum duration parameter 310) of input measurements.

For example, after four iterations (time epochs 1-4), a first RAIV hybrid filter (RF 1) in filter slot 1 and a second RAIV hybrid filter (RF 2) in filter slot 2 are operating at the same time. The first RAIV hybrid filter is operating on measurements from time epochs 1-4 and the second RAIV hybrid filter is operating on measurements just from time epoch 4. Each RAIV hybrid filter has a limited filter run time, which is defined by the filter maximum duration parameter 310.

After the filter run time has completed for a given filter slot, this filter slot is re-initialized using the output of the BIV hybrid filter and radar altimeter, and then run for another filter duration. For example, after the first RAIV hybrid filter (RF 1) has reached the filter maximum duration, filter slot 1 is re-initialized from a current BIV hybrid filter output and radar altimeter measurement (as RF N+1). Likewise, after the second RAIV hybrid filter (RF 2) has reached the filter maximum duration, filter slot 2 is re-initialized from a current BIV hybrid filter output and radar altimeter measurement (as RF N+2). This same process is also performed for the other filter slots at the appropriate time epochs.

The terrain variations are identified when the consistency checks of the filters identify outputs that are statistically inconsistent with each other. The consistency checks use innovation monitoring to detect inconsistencies between radar altimeter measurements and range-to-ground estimated statistics. This approach provides another layer of protection against terrain variation. The main layer of protection is guaranteed by the time limited staggered intervals of measurement data processed by Kalman filters, which are by design, immune to excessive errors due to terrain variations that occur further in the past than the filter maximum duration (e.g., seconds in the past).

For some time period after filter initialization, there are N number of filters running in parallel and each filter is providing an output. Therefore, there is a need for a decision (output selection logic) on how to compute the representative output based on the number of parallel filters. For example, the output of the system with multiple RAIV hybrid filters operating in parallel can be based on different rules depending on required behavior. Examples of such rules include: a filter with the longest duration can be used to drive the output; a filter with the lowest variance can be used to drive the output; a median over all filters can be used to drive the output; a filter likelihood metric can be used that selects one of the filter outputs; or a blending filter can be used that fuses the output of the multiple filters operating in parallel.

In addition, each RAIV hybrid filter can be reinitialized based on various criteria. For example, if the filter maximum duration parameter is reached, then each filter can be reinitialized; or if consistency monitoring detects inconsistencies in a given filter, then each filter can be reinitialized. This ensures that the current output is driven by a limited number of consistent measurements going back in time.

Figure 4:
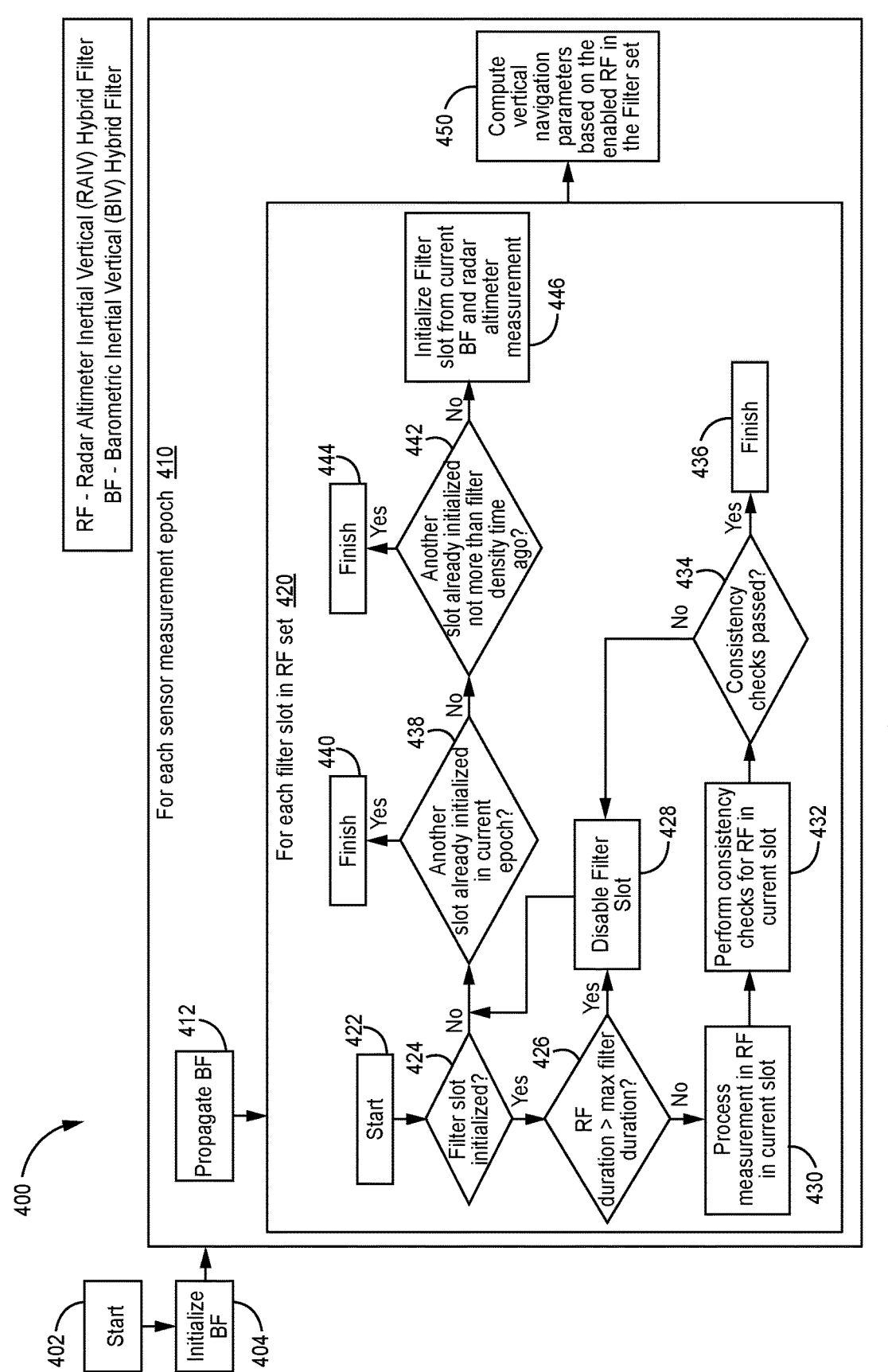
FIG. 4 is a flow diagram of a method for operating a RAIV hybrid filter set, according to one implementation.

FIG. 4 is a flow diagram of a method 400 for operating a RAIV hybrid filter set, according to one implementation. In FIG. 4, "RF" refers to a RAIV hybrid filter and "BF" refers to a BIV hybrid filter. After the start of method 400 (block 402), the BF is initialized using standard techniques (block 404). Thereafter, for each sensor measurement epoch (block 410), method 400 propagates the initialized BF (block 412) for use in processing each filter slot in the RF set (block 420).

After the start of processing for each filter slot in a current iteration (block 422), the determination is made whether a current filter slot is initialized (block 424). If yes, then the determination is made whether an RF duration is greater than a user defined maximum filter duration (block 426). If the RF duration is greater than the user defined maximum filter duration, then the current filter slot is disabled (block 428). If the RF duration is not greater than the user defined maximum filter duration (at block 426), then measurements in the RF of the current slot are processed (block 430), such as input vehicle kinematic statistics and measurement statistics, such as using standard Kalman filter measurement techniques. Consistency checks are then performed for the processed measurements of the RF in the current slot (block 432), and the determination is made whether the consistency checks are passed (block 434). If yes, then the processed measurements from the current filter slot in the current iteration are made ready for output in a finish step (block 436). If the consistency checks are not passed (at block 434), then the current filter slot is disabled (at block 428).

Returning to block 424, if the current filter slot is not initialized, or has been disabled (from block 428), then the determination is made whether another filter slot for any other RF is already initialized in the current epoch (block 438). If yes, then the processing of the current filter slot is stopped at a finish step (block 440). If another filter slot is not already initialized at the current epoch (at block 438), then the determination is made whether another filter slot has already been initialized at a time within the filter density time parameter (block 442). If yes, then the processing of the current filter slot is stopped at a finish step (block 444). If another filter slot is not already initialized within the time specified by the filter density time parameter, then the current filter slot is initialized from a current output of the BF and a radar altimeter measurement (block 446).

When the processing for each filter slot in the RF set (at block 420) is completed, method 400 computes vertical navigation parameters based on each the enabled RFs in the filter set (block 450), for each sensor measurement epoch (at block 410), using output selection logic. The computed vertical navigation parameters, such as altitude and vertical velocity, are then sent to a vehicle navigation system.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a system comprising: a radar altimeter onboard a vehicle and operative to produce range-to-ground measurements for the vehicle; an aided inertial navigation system (INS) or an Attitude and Heading Reference System (AHRS) onboard the vehicle, the aided INS or the AHRS operative to produce vertical acceleration, roll, and pitch measurements for the vehicle; an air data system onboard the vehicle and operative to produce barometric altitude measurements for the vehicle; and at least one processor onboard the vehicle, the at least one processor including a barometric inertial vertical (BIV) hybrid filter, and a radar altimeter inertial vertical (RAIV) hybrid filter set that is in operative communication with the BIV hybrid filter; wherein the BIV hybrid filter is configured to receive vertical acceleration measurements from the aided INS or the AHRS, and barometric altitude measurements from the air data system; wherein the RAIV hybrid filter set is configured to receive input measurements comprising the vertical acceleration, roll, and pitch measurements from the aided INS or the AHRS, BIV hybrid filter statistics, and the range-to-ground measurements from the radar altimeter; wherein the RAIV hybrid filter set comprises a plurality of hybrid filters configured to operate in parallel with each other in respective filter slots, wherein a hybrid filter in each filter slot operates on partially overlapping, time limited staggered intervals of the input measurements, with respect to other hybrid filters in other filter slots, wherein an interval size and an overlapping size are respectively user defined by a maximum filter duration parameter and a filter density time parameter; wherein estimated vertical navigation statistics for the vehicle are computed based on the input measurements processed in the filter slots of the hybrid filters that are enabled in the RAIV hybrid filter set; wherein the filter slots of the hybrid filters are operative to mitigate effects of terrain variations on the estimated vertical navigation statistics for the vehicle that are output by the RAIV hybrid filter set.

Example 2 includes the system of Example 1, wherein each hybrid filter at each measurement epoch is configured to operate by a process that comprises: determine whether a first filter slot for a first hybrid filter is initialized from an output of the BIV hybrid filter and radar altimeter measurements in a current epoch; if the first filter slot is initialized, then determine whether a duration of the first filter slot is greater than the maximum filter duration parameter; if the duration of the first filter slot is greater than the maximum filter duration parameter, then disable the first filter slot; if the duration of the first filter slot is not greater than the maximum filter duration parameter, then process the input measurements in the first filter slot; perform consistency checks for any processed input measurements in the first filter slot; and determine whether the consistency checks are passed; if the consistency checks are passed, then output current estimated state vector statistics from the first filter slot; if the consistency checks are not passed, then disable the first filter slot.

Example 3 includes the system of Example 2, wherein: if the first filter slot is not initialized, then determine whether a filter slot for any other hybrid filter is already initialized in the current epoch or at a time epoch not more than the filter density time parameter; and if the filter slot for any other hybrid filter is not already initialized at the current epoch or within a time defined by the filter density time parameter, then initialize the first filter slot from a current output of the BIV hybrid filter and radar altimeter measurements.

Example 4 includes the system of any of Examples 1-3, wherein the estimated vertical navigation statistics for the vehicle comprise vertical position and its error statistics, and vertical velocity and its error statistics.

Example 5 includes the system of any of Examples 1-4, wherein the estimated vertical navigation statistics are output from the RAIV hybrid filter set to an onboard vehicle navigation system.

Example 6 includes the system of Example 5, wherein the onboard vehicle navigation system comprises an autoland system that generates and outputs navigation information for safely landing the vehicle in a landing zone.

Example 7 includes the system of any of Examples 1-6, wherein the vehicle is an uncrewed aircraft system (UAS) vehicle.

Example 8 includes the system of any of Examples 1-6, wherein the vehicle is an urban air mobility (UAM) vehicle.

Example 9 includes a method comprising: providing at least one processor onboard a vehicle, the at least one processor including a BIV hybrid filter, and a RAIV hybrid filter set in operative communication with the BIV hybrid filter, wherein the RAIV hybrid filter set comprises a plurality of hybrid filters that operate in parallel with each other in respective filter slots; providing a plurality of sensors onboard the vehicle, the sensors comprising a radar altimeter, an aided INS or AHRS, and an air data system, the sensors operative to produce measurements; inputting vertical acceleration measurements for the vehicle, from the aided INS or AHRS, into the BIV hybrid filter; inputting barometric altitude measurements for the vehicle, from the air data system, into the BIV hybrid filter; inputting vertical acceleration, roll, and pitch measurements for the vehicle, from the aided INS or AHRS, into the RAIV hybrid filter set; inputting BIV hybrid filter output statistics into the RAIV hybrid filter set; inputting range-to-ground measurements, from the radar altimeter, into the RAIV hybrid filter set; processing the inputted measurements in the filter slots of the hybrid filters that are enabled in the RAIV hybrid filter set; computing estimated vertical navigation statistics for the vehicle based on processed vehicle kinematic statistics and measurement statistics; and outputting the estimated vertical navigation statistics from the RAIV hybrid filter set to an onboard vehicle navigation system.

Example 10 includes the method of Example 9, wherein a hybrid filter in each filter slot operates on partially overlapping, time limited staggered intervals of the inputted measurements, with respect to other hybrid filters in other of the filter slots, wherein an interval size and an overlapping size are respectively user defined by a maximum filter duration parameter and a filter density time parameter.

Example 11 includes the method of Example 10, wherein each of the hybrid filters at each measurement epoch operate by a process comprising: determining whether a first filter slot for a first hybrid filter is initialized from BIV hybrid filter and radar altimeter measurements in a current epoch; if the first filter slot is initialized, then determining whether a duration of the first filter slot is greater than the maximum filter duration parameter; disabling the first filter slot if the duration of the first filter slot is greater than the maximum filter duration parameter; processing the inputted measurements in the first filter slot if the duration of the first filter slot is not greater than the maximum filter duration parameter; performing consistency checks for any processed inputted measurements in the first filter slot; and determining whether the consistency checks are passed; if the consistency checks are passed, then outputting current estimated state vector statistics from the first filter slot; if the consistency checks are not passed, then disabling the first filter slot.

Example 12 includes the method of Example 11, wherein: if the first filter slot is not initialized, then determining whether a filter slot for any other hybrid filter in the RAIV hybrid filter set is already initialized in the current epoch or at a time not more than the filter density time parameter; and if the filter slot for any other hybrid filter is not already initialized at the current epoch or at a time not more than the filter density time parameter, then initializing the first filter slot from a current output of the BIV hybrid filter and the range-to-ground measurements from the radar altimeter.

Example 13 includes the method of any of Examples 9-12, wherein the estimated vertical navigation statistics comprise: an inertially smoothed height above ground; a vertical velocity; and variance, integrity, and filter mode information.

Example 14 includes the method of any of Examples 9-13, wherein the onboard vehicle navigation system comprises an autoland system that generates and outputs navigation information for safely landing the vehicle in a landing zone.

Example 15 includes the method of any of Examples 9-14, wherein the vehicle is an UAS vehicle.

Example 16 includes the method of any of Examples 9-14, wherein the vehicle is an UAM vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
a radar altimeter onboard a vehicle and operative to produce range-to-ground measurements for the vehicle;
an aided inertial navigation system (INS) or an Attitude and Heading Reference System (AHRS) onboard the vehicle, the aided INS or the AHRS operative to produce vertical acceleration, roll, and pitch measurements for the vehicle;
an air data system onboard the vehicle and operative to produce barometric altitude measurements for the vehicle; and
at least one processor onboard the vehicle, the at least one processor including a barometric inertial vertical (BIV) hybrid filter, and a radar altimeter inertial vertical (RAIV) hybrid filter set that is in operative communication with the BIV hybrid filter;

wherein the BIV hybrid filter is configured to receive vertical acceleration measurements from the aided INS or the AHRS, and barometric altitude measurements from the air data system;
wherein the RAIV hybrid filter set is configured to receive input measurements comprising the vertical acceleration, roll, and pitch measurements from the aided INS or the AHRS, BIV hybrid filter statistics, and the range-to-ground measurements from the radar altimeter;
wherein the RAIV hybrid filter set comprises a plurality of hybrid filters configured to operate in parallel with each other in respective filter slots, wherein a hybrid filter in each filter slot operates on partially overlapping, time limited staggered intervals of the input measurements, with respect to other hybrid filters in other filter slots, wherein an interval size and an overlapping size are respectively user defined by a maximum filter duration parameter and a filter density time parameter;
wherein estimated vertical navigation statistics for the vehicle are computed based on the input measurements processed in the filter slots of the hybrid filters that are enabled in the RAIV hybrid filter set;
wherein the filter slots of the hybrid filters are operative to mitigate effects of terrain variations, without usage of a terrain map or terrain database, on the estimated vertical navigation statistics for the vehicle that are output by the RAIV hybrid filter set;
wherein the estimated vertical navigation statistics are output from the RAIV hybrid filter set to an onboard vehicle navigation system that generates and outputs navigation guidance information to aid in controlling navigation of the vehicle.

2. The system of claim 1, wherein each hybrid filter at each measurement epoch is configured to operate by a process that comprises:
determine whether a first filter slot for a first hybrid filter is initialized from an output of the BIV hybrid filter and radar altimeter measurements in a current epoch;
if the first filter slot is initialized, then determine whether a duration of the first filter slot is greater than the maximum filter duration parameter;
if the duration of the first filter slot is greater than the maximum filter duration parameter, then disable the first filter slot;
if the duration of the first filter slot is not greater than the maximum filter duration parameter, then process the input measurements in the first filter slot;
perform consistency checks for any processed input measurements in the first filter slot; and
determine whether the consistency checks are passed;
if the consistency checks are passed, then output current estimated state vector statistics from the first filter slot;
if the consistency checks are not passed, then disable the first filter slot.

3. The system of claim 2, wherein:
if the first filter slot is not initialized, then determine whether a filter slot for any other hybrid filter is already initialized in the current epoch or at a time epoch not more than the filter density time parameter; and
if the filter slot for any other hybrid filter is not already initialized at the current epoch or within a time defined by the filter density time parameter, then initialize the first filter slot from a current output of the BIV hybrid filter and radar altimeter measurements.

4. The system of claim 1, wherein the estimated vertical navigation statistics for the vehicle comprise vertical position and its error statistics, and vertical velocity and its error statistics.

5. The system of claim 1, wherein the onboard vehicle navigation system comprises an autoland system that generates and outputs navigation information for safely landing the vehicle in a landing zone.

6. The system of claim 1, wherein the vehicle is an uncrewed aircraft system (UAS) vehicle.

7. The system of claim 1, wherein the vehicle is an urban air mobility (UAM) vehicle.

8. A method comprising:

providing at least one processor onboard a vehicle, the at least one processor including a barometric inertial vertical (BIV) hybrid filter, and a radar altimeter inertial vertical (RAIV) hybrid filter set in operative communication with the BIV hybrid filter, wherein the RAIV hybrid filter set comprises a plurality of hybrid filters that operate in parallel with each other in respective filter slots;

providing a plurality of sensors onboard the vehicle, the sensors comprising a radar altimeter, an aided inertial navigation system (INS) or an Attitude and Heading Reference System (AHRS), and an air data system, the sensors operative to produce measurements;

inputting vertical acceleration measurements for the vehicle, from the aided INS or the AHRS, into the BIV hybrid filter;

inputting barometric altitude measurements for the vehicle, from the air data system, into the BIV hybrid filter;

inputting vertical acceleration, roll, and pitch measurements for the vehicle, from the aided INS or the AHRS, into the RAIV hybrid filter set;

inputting BIV hybrid filter output statistics into the RAIV hybrid filter set;

inputting range-to-ground measurements, from the radar altimeter, into the RAIV hybrid filter set;

processing the inputted measurements in the filter slots of the hybrid filters that are enabled in the RAIV hybrid filter set;

computing estimated vertical navigation statistics for the vehicle based on processed vehicle kinematic statistics and measurement statistics; and outputting the estimated vertical navigation statistics from the RAIV hybrid filter set to an onboard vehicle navigation system;

wherein the filter slots of the hybrid filters mitigate effects of terrain variations, without usage of a terrain map or terrain database, on the estimated vertical navigation statistics;

wherein the onboard vehicle navigation system generates and outputs navigation guidance information to aid in controlling navigation of the vehicle.

9. The method of claim 8, wherein a hybrid filter in each filter slot operates on partially overlapping, time limited staggered intervals of the inputted measurements, with respect to other hybrid filters in other of the filter slots, wherein an interval size and an overlapping size are respectively user defined by a maximum filter duration parameter and a filter density time parameter.

10. The method of claim 9, wherein each of the hybrid filters at each measurement epoch operate by a process comprising:

determining whether a first filter slot for a first hybrid filter is initialized from an output of the BIV hybrid filter and radar altimeter measurements in a current epoch;

if the first filter slot is initialized, then determining whether a duration of the first filter slot is greater than the maximum filter duration parameter;

disabling the first filter slot if the duration of the first filter slot is greater than the maximum filter duration parameter;

processing the inputted measurements in the first filter slot if the duration of the first filter slot is not greater than the maximum filter duration parameter;

performing consistency checks for any processed inputted measurements in the first filter slot; and determining whether the consistency checks are passed;

if the consistency checks are passed, then outputting current estimated state vector statistics from the first filter slot;

if the consistency checks are not passed, then disabling the first filter slot.

11. The method of claim 10, wherein:

if the first filter slot is not initialized, then determining whether a filter slot for any other hybrid filter in the RAIV hybrid filter set is already initialized in the current epoch or at a time not more than the filter density time parameter; and if the filter slot for any other hybrid filter is not already initialized at the current epoch or at a time not more than the filter density time parameter, then initializing the first filter slot from a current output of the BIV hybrid filter and the range-to-ground measurements from the radar altimeter.

12. The method of claim 8, wherein the estimated vertical navigation statistics comprise:

an inertially smoothed height above ground;

a vertical velocity; and variance, integrity, and filter mode information.

13. The method of claim 8, wherein the onboard vehicle navigation system comprises an autoland system that generates and outputs navigation information for safely landing the vehicle in a landing zone.

14. The method of claim 8, wherein the vehicle is an uncrewed aircraft system (UAS) vehicle.

15. The method of claim 8, wherein the vehicle is an urban air mobility (UAM) vehicle.

* * * * *